Sept. 5, 1944. C. H. HARRIS 2,357,326
FOCUSING OBJECTIVE MOUNT
Filed Oct. 3, 1941
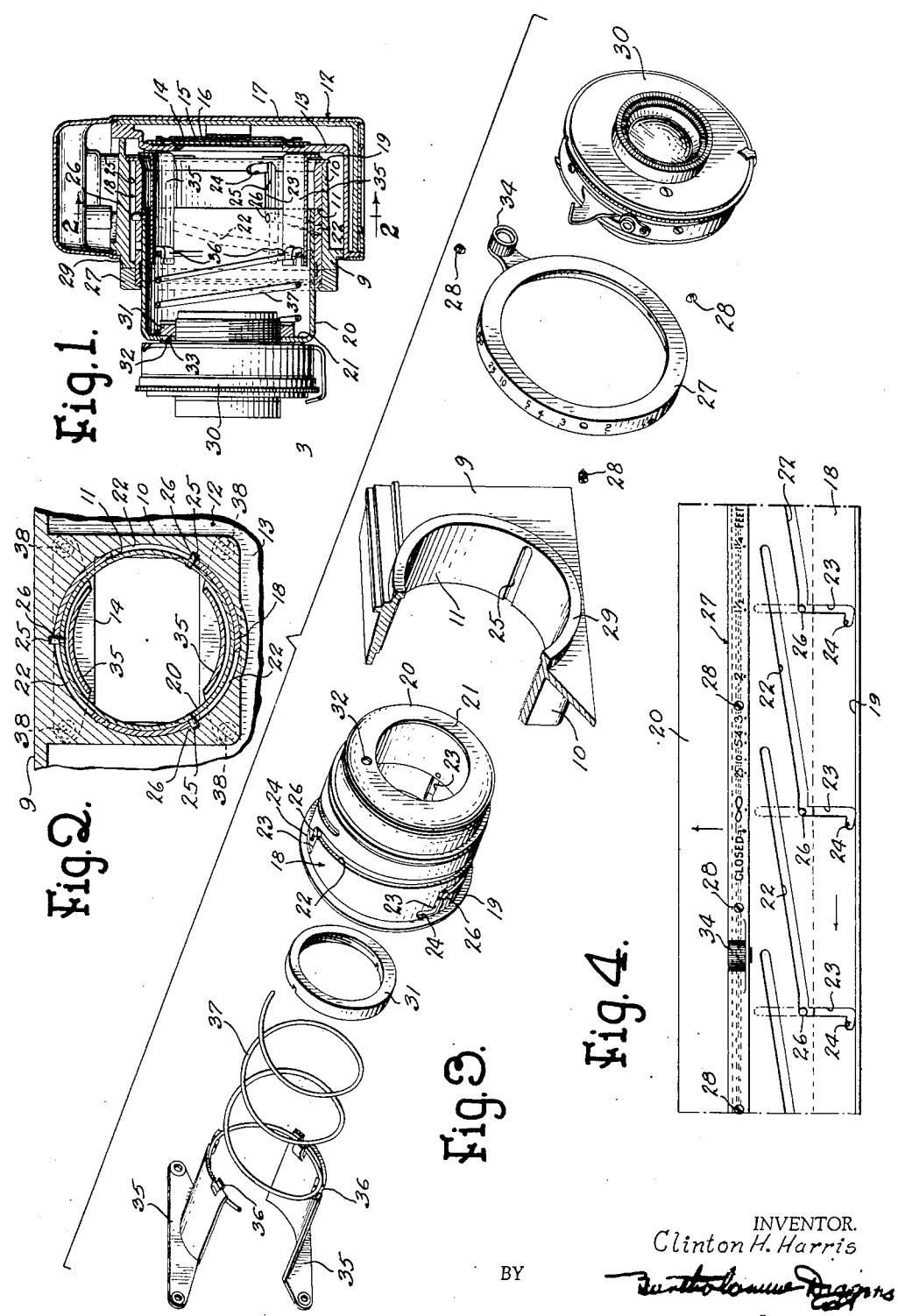
INVENTOR.
Clinton H. Harris
BY
Attorney Patented Sept. 5, 1944

2,357,326

UNITED STATES PATENT OFFICE 2,357,326

FOCUSING OBJECTIVE MOUNT

Clinton H. Harris, Ann Arbor, Mich., assignor to Argus, Incorporated, a corporation of Michigan Application October 3, 1941, Serial No. 413,515

10 Claims. (Cl. 95—45)

The present invention relates to lens mounts and more particularly to focusing lens mounts for cameras. One of the objects of the present invention is to provide a simple and inexpensive lens mount, having a long and accurate focusing movement. Another object is to provide a focusing lens mount which may be collapsed into an inoperative position. A further object is to provide a focusing lens mount which may be moved from a compact collapsed position through its entire range of focus by a single adjusting member. These and other objects and advantages reside in certain novel features of construction, arrangement and combination of parts as will hereinafter be more fully set forth and pointed out in the appended claims.

In the drawing:

Fig. 1 is a vertical section of a camera provided with my new lens mount.

Fig. 2 is a fragmentary vertical section taken on line 2—2 of Fig. 1.

Fig. 3 is an exploded view of my improved lens mount.

Fig. 4 is a schematic view showing the operation of my lens mount.

A preferred embodiment of my invention is illustrated in the drawing, wherein 9 designates the front plate of a camera. This front plate 9 has a rearwardly extending portion 10 provided with a cylindrical bore 11 and is secured in a camera body indicated generally at 12. This camera body has an aperture plate 13 provided with an aperture 14 over which the film 15 passes. The film is held in position by a pressure plate 16 secured to the camera back 17. The structural details of the camera body, however, form no part of the present invention and are described and claimed in my copending application, Serial No. 413,518, filed concurrently herewith.

A sleeve 18 provided with an outward flange 19, is rotatably journalled in the cylindrical bore 11 of the front plate 10 with the flange 19, which is larger than the bore 11, engaging the rear end of the portion 10. A number of long slots are formed in the sleeve 18 and each of these slots has a cam portion 22, a longitudinal portion 23 extending from the rearward end of the portion 22 toward the flange 19 and a short reverse portion 24 at the rear end of the portion 23. In my preferred embodiment, I use three of these slots spaced 120° apart in the sleeve 18.

An inner sleeve 20 is slidably mounted in the sleeve 18, and a plurality of studs 26, one for each slot, are fixed in the side wall of the sleeve 20. These studs 26 extend through the slots in the sleeve 18 into a plurality of longitudinal grooves 25 in the bore 11. An annular ring 27 is fastened on the forward end of the sleeve 18 by set screws 28 and bears against an annular hub 29 on the front plate 10 surrounding the cylindrical bore 11. A photographic lens and shutter assembly indicated at 30 is fastened in a flange 21 on the sleeve 20 by a lock-nut 31. In order to hold this shutter assembly against rotation in the sleeve 20, the flange 21 is provided with an aperture 32 for receiving a pin 33 fixed on the rear of the shutter assembly 30.

A pair of brackets 35 are suitably fastened to the rear of the portion 10 of the front plate 9 by screws or bolts 38. These brackets extend forwardly within the sleeve 20 and are provided at their forward ends with seats 36. A helical compression spring 37 mounted in these seats 36 engages the rear surface of the flange 21 of the sleeve 20. This spring thus always urges forward the sleeve 20 and lens and shutter assembly 30.

In the usual operation of the camera, the studs 26 are in the slots 22 of the sleeve 18, the studs remaining in these slots through the entire focusing range of the camera. When it is desired to collapse the lens mount into an inoperative position, the lens is moved into the infinity position by means of the focusing handle 34. The studs are then in the position indicated in Fig. 4, that is, at the junction of the rear end of slot portion 22 and the forward end of slot portion 23. The lens and shutter assembly 30 and the sleeve 20 may then be pressed rearwardly against the action of the spring 37 until the studs 26 reach the rearward end of the slot portion 23. A slight movement of the focusing handle 34 turns the sleeve 18 to bring the studs 26 into the short reversed slot portion 24. The lens mount is then locked in collapsed position. When the operator again wishes to use the camera, it is only necessary to turn the handle 34 and when the slot portion 23 is brought into alignment with the studs 26 the force of the spring 37 snaps the lens forward to the infinity position. Suitable indicia showing the focus position of the lens, as well as the closed position, may be suitably engraved on the annular ring 27 as shown in Figures 3 and 4.

From the foregoing, it will be apparent that I am able to attain the objects of my invention and provide a simple and inexpensive lens mount which is accurate in operation and may be moved into a compact collapsed position. While I have illustrated my lens mount as a built-in, integral part of the camera, it is apparent that it can be made as an independent focusing unit applicable to cameras of widely different types. Various modifications can, of course, be made without departing from the spirit of my invention or the scope of the appended claims.

I claim:

1. In a camera having a hollow recess, a front plate secured to said camera over said recess, a projection on said front plate extending rearwardly into said recess, said projection having a cylindrical bore therethrough, a focusing sleeve rotatably mounted in said bore, a lens sleeve slidably mounted within said focusing sleeve, a lens carried by said lens sleeve, spring means normally urging said lens sleeve and lens outwardly, cooperating means on said projection, focusing sleeve and lens sleeve for moving said lens sleeve throughout the focusing range of the lens when said lens sleeve is in its outer position and cooperating means on said projection, focusing sleeve and lens sleeve for releasably locking said lens sleeve in its inner position.

2. A focusing lens mount comprising an outer fixed sleeve, an inner sleeve slidably mounted within said fixed sleeve, a connection between said outer and inner sleeves preventing rotation of the latter, means for mounting a lens on said inner sleeve, said inner sleeve being axially movable outwardly from a collapsed, inoperative position through an infinity focus position to a near focus position, an intermediate sleeve rotatably mounted between said fixed sleeve and said outer sleeve and held against axial movement, cam means on said intermediate sleeve for gradually moving the inner sleeve between the infinity focus position and the near focus position when said intermediate sleeve is rocked through one range of angular movement, and means on said intermediate sleeve for releasably locking said inner sleeve in its inoperative collapsed position when said intermediate sleeve is rocked beyond said one range of angular movement.

3. A focusing lens mount comprising an outer fixed sleeve, an inner sleeve slidably mounted within said fixed sleeve, a connection between said outer and inner sleeves preventing rotation of the latter, means for mounting a lens on said inner sleeve, said inner sleeve being axially movable outwardly from a collapsed, inoperative position through an infinity focus position to a near focus position, an intermediate sleeve rotatably mounted between said fixed sleeve and said outer sleeve and held against axial movement, cam means on said intermediate sleeve for moving the inner sleeve between the infinity focus position and the near focus position upon rocking of said intermediate sleeve through one range of angular movement, a bracket fixed on said outer sleeve and spring means between said bracket and said inner sleeve for urging said inner sleeve toward the near focus position, and means on said intermediate sleeve for releasably locking said inner sleeve in collapsed position against the action of said spring means when said intermediate sleeve is rocked beyond said one range of said angular movement.

4. A focusing lens mount comprising an outer fixed sleeve having a longitudinal groove therein, an intermediate sleeve rotatably mounted in said fixed sleeve, said intermediate sleeve having an angular transverse cam slot therein terminating in a rearwardly extending longitudinal slot, an inner sleeve slidably mounted in said intermediate sleeve, means for mounting a lens on said inner sleeve, a pin secured to the inner sleeve and extending outwardly through said slot into said groove and means for releasably locking said pin at the rear end of said longitudinal slot.

5. A focusing mount for objectives, comprising a fixed outer barrel, an intermediate barrel rotatably mounted in said outer barrel, an inner barrel slidably mounted in said intermediate barrel, a pin fixed on said inner barrel and projecting radially outwardly therefrom, said intermediate barrel having a cam slot therethrough for engaging said pin to move the inner barrel between an infinity position and a close-up position upon rotation of said intermediate barrel through one range of angular movement, means on said outer barrel for engaging said pin to prevent rotation of said inner barrel while permitting longitudinal movement thereof, said inner barrel being movable from the infinity position to an inoperative collapsed position, spring means for urging said inner sleeve toward said close-up position, and means on said intermediate barrel cooperating with said pin to lock said inner barrel in collapsed position against the action of said spring means when said intermediate barrel is rocked into a predetermined angular position beyond said one range of angular movement.

6. In a camera, a lens tube axially slidable between a retracted inoperative position and an extended operative position, means for effecting gradual displacement of said lens between near focus and infinity focus position only while said lens tube is in said extended position, said means also being selectively operable to lock said lens tube in retracted position; and resilient means for snapping said lens tube to extended position upon release thereof by said means.

7. In a camera, a rotatable focusing sleeve held against axial displacement, a non-rotatable lens carrying sleeve mounted coaxial with said focusing sleeve for axial displacement between a retracted inoperative position and an extended operative position, and pin and slot connections between said sleeves comprising a pin on one of said sleeves and communicating slots on the other of said sleeves, said communicating slots comprising a transverse slot in which the pin is disposed for locking said lens carrying sleeve in retracted position, a longitudinal slot in which said pin is disposed for permitting displacement of said lens carrying sleeve between said extended and retracted positions, and a transverse cam slot for effecting focusing movement of said lens carrying sleeve upon rotation of the focusing sleeve when the former is in extended operative position.

8. In a camera body having a chamber, a lens sleeve mounted for movement longitudinally from an extended operative position to a collapsed inoperative position with respect to said chamber and restrained against rotation about its axis; resilient means constantly urging said sleeve toward extended position; an adjusting sleeve concentric with said lens sleeve and mounted for rocking movement about the axis of said lens sleeve; means restraining said adjusting sleeve against axial movement; coacting means on said sleeves for locking said lens sleeve in collapsed position against the action of said resilient means when said adjusting sleeve is disposed in a predetermined angular locking position, said coacting means being operable to release said lens sleeve and permit said resilient means to advance it to extended position when said adjusting sleeve is rocked a predetermined angular distance into a release position, said coacting means also embodying cam means operable to effect gradual focusing movements of said lens sleeve beyond said extended position when said adjusting sleeve is rocked a further angular distance beyond said release position.

9. The camera structure defined in claim 8, wherein said adjusting sleeve is mounted for rocking movement in said camera body and said lens sleeve is mounted for axial sliding movement in said adjusting sleeve, and said coacting means is also operable to restrain said lens sleeve against rotation.

10. The camera structure defined in claim 8, wherein said coacting means comprises a plurality of pins on one of said sleeves cooperating in engagement with the walls of slots provided in the other of said sleeves, said slots each having a transverse portion for locking said lens sleeve in collapsed position, an intermediate longitudinal portion for allowing said lens sleeve to move between collapsed and extended positions; and an inclined cam portion for effecting gradual focusing movements of said lens sleeve beyond said extended position.

CLINTON H. HARRIS.